(12) United States Patent
Wormser et al.

(10) Patent No.: US 10,570,348 B2
(45) Date of Patent: Feb. 25, 2020

(54) ALL-STEAM GASIFICATION FOR SUPERCRITICAL $CO_2$ POWER CYCLE SYSTEM

(71) Applicant: Wormser Energy Solutions, Inc., Marblehead, MA (US)

(72) Inventors: Alex Wormser, Marblehead, MA (US); John Parkes, Los Altos, CA (US); Douglas M. Todd, Galway, NY (US)

(73) Assignee: Wormser Energy Solutions, Inc., Lancaster, MA (US)

(*) Notice: Subject to any disclaimer, the term of this patent is extended or adjusted under 35 U.S.C. 154(b) by 214 days.

(21) Appl. No.: 15/868,334

(22) Filed: Jan. 11, 2018

(65) Prior Publication Data

US 2018/0201849 A1    Jul. 19, 2018

Related U.S. Application Data

(60) Provisional application No. 62/446,453, filed on Jan. 15, 2017.

(51) Int. Cl.
*C10J 3/46* (2006.01)
*C10J 3/50* (2006.01)
(Continued)

(52) U.S. Cl.
CPC .............. *C10J 3/466* (2013.01); *C10J 3/485* (2013.01); *C10J 3/506* (2013.01); *C10J 3/60* (2013.01);
(Continued)

(58) Field of Classification Search
CPC combination set(s) only.
See application file for complete search history.

(56) References Cited

U.S. PATENT DOCUMENTS 3,276,203 A * 10/1966 Squires ................ F01K 25/005
                                                    60/775
3,373,562 A    3/1968 Wormser
(Continued)

FOREIGN PATENT DOCUMENTS

EP         0067580 A1    12/1982
WO    2013109616 A1     7/2013

OTHER PUBLICATIONS

"Notification of Transmittal of the International Search Report and the Written Opinion of the International Searching Authority, or the Declaration" for International Patent Application No. PCT/US2016/055602, Jan. 11, 2017, 13 Pages, International Searching Authority/KR, Korean Intellectual Property Office, Daejeon, Republic of Korea.

(Continued)

*Primary Examiner* — Kaity V Chandler
(74) *Attorney, Agent, or Firm* — Kurt Rauschenbach; Rauschenbach Patent Law Group, LLC

(57) ABSTRACT

A carbonaceous fuel gasification system for a supercritical $CO_2$ power cycle system includes a micronized char preparation system comprising a devolatilizer that receives solid carbonaceous fuel, hydrogen, oxygen, and fluidizing steam and produces micronized char, steam, hydrogen, and volatiles. An indirect gasifier includes a vessel comprising a gasification chamber that receives the micronized char, a conveying gas, and steam where the gasification chamber provides syngas, ash, and steam. A combustion chamber receives syngas and an oxidant and burns the mixture of syngas with the oxidant to provide heat for gasification and for heating incoming flows, thereby generating steam and $CO_2$. The heat for gasification is transferred from the combustion chamber to the gasification chamber by circulating refractory sand. A syngas cooler cools the syngas and (Continued)

generates steam and provides to a supercritical $CO_2$ power cycle system that performs a supercritical $CO_2$ power cycle for generating power.

19 Claims, 3 Drawing Sheets

(51) Int. Cl.
  *C10J 3/48* (2006.01)
  *C10J 3/82* (2006.01)
  *C10J 3/60* (2006.01)
(52) U.S. Cl.
  CPC .......... *C10J 3/82* (2013.01); *C10J 2300/0903* (2013.01); *C10J 2300/093* (2013.01); *C10J 2300/094* (2013.01); *C10J 2300/0956* (2013.01); *C10J 2300/0959* (2013.01); *C10J 2300/0976* (2013.01); *C10J 2300/1215* (2013.01); *C10J 2300/1246* (2013.01); *C10J 2300/1653* (2013.01); *C10J 2300/1687* (2013.01); *C10J 2300/1853* (2013.01); *Y02E 20/16* (2013.01); *Y02E 20/18* (2013.01); *Y02P 20/544* (2015.11)

(56) References Cited

U.S. PATENT DOCUMENTS

| | | | |
|---|---|---|---|
| 4,003,691 A | 1/1977 | Wormser | |
| 4,013,395 A | 3/1977 | Wormser | |
| 4,051,791 A | 10/1977 | Wormser | |
| 4,135,885 A | 1/1979 | Wormser et al. | |
| 4,149,559 A | 4/1979 | Wormser | |
| 4,253,409 A | 3/1981 | Wormser | |
| 4,279,205 A | 7/1981 | Perkins et al. | |
| 4,279,207 A | 7/1981 | Wormser | |
| 4,303,023 A | 12/1981 | Perkins et al. | |
| 4,499,857 A | 2/1985 | Wormser | |
| 4,578,175 A | 3/1986 | Gorin | |
| 5,122,346 A | 6/1992 | Wormser | |
| 5,655,853 A | 8/1997 | Wormser | |
| 5,997,220 A | 12/1999 | Wormser | |
| 6,877,322 B2 | 4/2005 | Fan | |
| 7,722,690 B2* | 5/2010 | Shires | C01B 3/36 422/139 |
| 9,174,844 B2 | 11/2015 | Ramkumar et al. | |
| 2004/0045272 A1 | 3/2004 | Miyoshi et al. | |
| 2004/0237404 A1 | 12/2004 | Andrus et al. | |
| 2008/0155899 A1* | 7/2008 | Ramamurthy | C10J 3/78 48/77 |
| 2009/0246120 A1* | 10/2009 | Raman | C01B 3/12 423/652 |
| 2009/0259080 A1* | 10/2009 | Raman | C01B 3/34 585/3 |
| 2010/0120926 A1* | 5/2010 | Robinson | C01B 3/34 518/703 |
| 2010/0129691 A1* | 5/2010 | Dooher | C01B 3/34 429/425 |
| 2010/0193742 A1* | 8/2010 | Oettinger | C10J 3/466 252/373 |
| 2010/0329963 A1 | 12/2010 | Sceats et al. | |
| 2011/0064648 A1* | 3/2011 | Preston | C01B 3/16 423/648.1 |
| 2012/0164032 A1 | 6/2012 | Wormser | |
| 2012/0167585 A1 | 7/2012 | Wormser | |
| 2012/0247080 A1 | 10/2012 | Ishii et al. | |
| 2012/0267577 A1 | 10/2012 | Sceats et al. | |
| 2012/0305848 A1* | 12/2012 | Sirdeshpande | C10J 3/463 252/373 |
| 2013/0017460 A1* | 1/2013 | Keefer | B01D 53/047 429/419 |
| 2013/0047574 A1* | 2/2013 | Kidambi | C01B 17/0404 60/39.12 |
| 2013/0177957 A1* | 7/2013 | Du | C12P 7/04 435/160 |
| 2014/0158939 A1 | 6/2014 | Ramkumar et al. | |
| 2014/0296586 A1* | 10/2014 | Chandran | C10J 3/482 585/240 |
| 2014/0352581 A1* | 12/2014 | Abanades Garcia | F23J 15/02 110/203 |
| 2015/0013575 A1* | 1/2015 | Yazdanpanah | C10J 3/482 110/229 |
| 2015/0292404 A1* | 10/2015 | Jin | C10J 3/00 60/781 |
| 2015/0376801 A1* | 12/2015 | Bairamijamal | B01D 53/002 204/257 |

OTHER PUBLICATIONS

"Notification of Transmittal of the International Search Report and the Written Opinion of the International Searching Authority, or the Declaration" for International Patent Application No. PCT/US2016/045268, Nov. 10, 2016, 9 Pages, International Searching Authority/KR, Korean Intellectual Property Office, Daejeon, Republic of Korea.

"Notification Concerning Transmittal of International Preliminary Report on Patentability (Chapter I of the Patent Cooperation Treaty)", For International Patent Application No. PCT/US2016/055602, Apr. 19, 2018, 9 Pages, International Bureau of WIPO, Geneva, Switzerland.

Notification Concerning Transmittal of International Preliminary Report on Patentability (Chapter I of the Patent Cooperation Treaty) for International Patent Application No. PCT/US2018/013317, Jul. 25, 2019, 7 Pages, The International Bureau of WIPO, Geneva, Switzerland.

Rietveld, et al. Commercialization of the ECN MILENA Gasification Technology, Jun. 2014, 21 pages.

Twin IHI Gasifier (TIGAR®), Current Status of Indonesian Demonstration Project and its Business Plan, Oct. 18, 2016, 19 pages, IHI Corporation, Vancouver, Canada.

"Notification Concerning Transmittal of International Preliminary Report on Patentability (Chapter I of the Patent Cooperation Treaty)", for International Patent Application No. PCT/US2016/045268, Feb. 15, 2018, 6 Pages, The International Bureau of WIPO, Geneva, Switzerland.

Butler, "Limestone as a Sorbent for CO2 Capture and its Application in Enhanced Biomass Gasification", Oct. 2013, 279 Pages, The University of British Colombia, Vancouver, Canada.

"Notification of the Transmittal of the International Search Report and the Written Opinion of the International Searching Authority, or the Declaration", For International Patent Application No. PCT/US2018/013317, dated Apr. 30, 2018, 10 Pages, Korean Intellectual Property Office ISA/KR, Daejeon, Republic of Korea.

* cited by examiner

ALL-STEAM GASIFICATION FOR SUPERCRITICAL $CO_2$ POWER CYCLE SYSTEM

CROSS REFERENCE TO RELATED APPLICATIONS

The present application is a non-provisional application of U.S. Provisional Patent Application Ser. No. 62/446,453, entitled "All-Steam Gasification for Supercritical CO2 Power Cycle System", filed on Jan. 15, 2017. The entire content of U.S. Provisional Patent Application Ser. No. 62/446,453 is herein incorporated by reference.

The present application is also related to U.S. patent application Ser. No. 15/227,137, entitled "All-Steam Gasification with Carbon Capture", filed on Aug. 3, 2016 which claims priority to U.S. Provisional Patent Application No. 62/201,625 entitled "Carbon Capture with All-Steam Gasification" filed on Aug. 6, 2015 and U.S. Provisional Patent Application No. 62/329,632 entitled "All-Steam Gasification with Carbon Capture" filed on Apr. 29, 2016. The present application is also related to U.S. patent application Ser. No. 15/286,514, entitled "Method and Apparatus for Adiabatic Calcium Looping, filed on Oct. 5, 2016 which claims priority to U.S. Provisional Patent Application No. 62/237,709 entitled "Advanced Adiabatic Calcium Looping" filed on Oct. 6, 2015. The entire contents of U.S. patent application Ser. Nos. 15/227,137 and 15/286,514 and U.S. Provisional Patent Application Nos. 62/201,625; 62/329, 632; and 62/237,709 are herein incorporated by reference.

The section headings used herein are for organizational purposes only and should not be construed as limiting the subject matter described in the present application in any way.

INTRODUCTION

Global warming concerns about $CO_2$ greenhouse gas accumulation in the atmosphere continue to grow. $CO_2$ emissions from fossil fuel energy power generation systems are considered by many experts to be a major culprit in the recent few decades for increasing $CO_2$ in the atmosphere. Even with major increases in renewables and nuclear energy sources, fossil fuel consumption continues to rise. As such, there is a significant need for efficient and effective low-carbon technologies, especially for power generation and chemical production.

Integrated gasification combined cycle (IGCC) technology is considered to be by many experts the cleanest way to make energy from coal. Gasification results in significantly fewer pollutants than pollutants produced by conventional coal power plants. An IGCC power plant burns syngas in a turbine to produce electricity. The excess heat is captured to power a second turbine that produces more electricity, resulting in high-efficiency power generation. Gasification of various solid fuels is commonly used to produce chemicals including fertilizers, methanol, diesel fuel, and many other chemicals. Gasification is beneficial to the environment because it results in less pollution, reduced carbon dioxide emission, less solid waste, and lower water use.

There is currently an interest in using supercritical $CO_2$ power cycles to improve IGCC clean energy systems. The U.S. government has funded multiple initiatives for research and development of supercritical $CO_2$ power cycles. Early market activity using supercritical $CO_2$ power cycle systems is underway. Companies have announced demonstration plants to prove feasibility of increasingly larger power outputs as high as 25 MWe.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
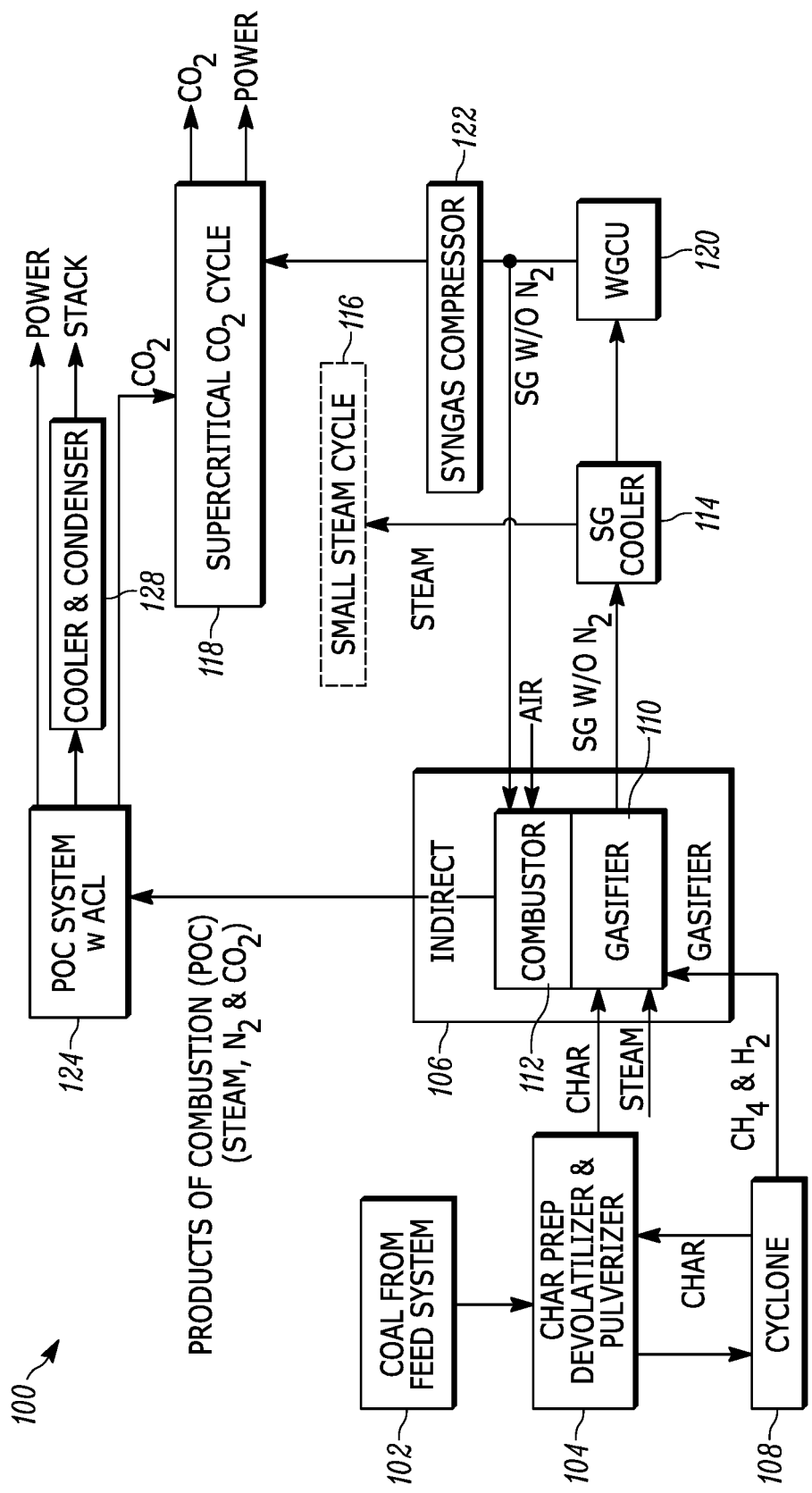
FIG. 1 illustrates a system block diagram of an all-steam gasification system with air-based combustion for a generic supercritical $CO_2$ power cycle system with carbon capture system according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Global warming and climate change issues are requiring that coal power plants world-wide add expensive controls to capture and store $CO_2$ in order to meet desired emission rates. In North America and Europe, current technologies such as IGCC with carbon capture for coal plants have proven uneconomical without subsidies. The additional power required to run the carbon capture systems reduces efficiency and output, and consequently widespread adoption has not occurred. This has led to the shutdown of older coal plants and cancellation of many new plants in North America. Still, many experts believe that coal is a valuable energy source to assist in transitioning the world toward renewable energy sources. Coal usage for power generation is expected to grow in Asia for at least the next 50 years.

Integrated gasification combined cycle using supercritical $CO_2$ power cycles is proving an important method for clean coal energy generation. Demonstration pilot plants are currently being constructed to prove the feasibility of supercritical $CO_2$ power cycles with outputs as high as 25 MWe using natural gas fuel. These demonstration pilot plants, and the large commercial power plants that result from the development, can greatly benefit from an all-steam gasification system using an indirect gasifier to increase the power generation efficiency, reduce size and cost, and generally result in a lower environmental footprint while using coal or other carbonaceous fuels.

Supercritical $CO_2$ is a fluid state of carbon dioxide maintained within the critical pressure and temperature range. In these ranges, the gas acts as both a liquid and a gas simultaneously. Supercritical $CO_2$ has many desirable features. Supercritical $CO_2$ flows like a gas, but dissolves materials like a liquid. Supercritical $CO_2$ reaches a supercritical state at moderate conditions. Supercritical $CO_2$ is also less corrosive than steam and has favorable thermal stability as compared to steam, which helps to reduce the power system footprint. In addition, supercritical $CO_2$ is non-toxic and non-flammable, so using it reduces the burden on power plant operations, which results in a lower cost of operation. Also, supercritical $CO_2$ is single phase, so it requires only single pressure exhaust heat exchangers, which can significantly lower the cost of the power plant. Furthermore, supercritical $CO_2$ can interface with many different heat sources.

Supercritical $CO_2$ is a particularly good working fluid for power generating turbines. Power turbines based on supercritical $CO_2$ power cycles can replace steam cycles in a wide variety of power generation applications and can provide relatively high efficiency and relatively low cost of electricity with modest inlet temperatures. Using supercritical $CO_2$ power cycles also can result in reduced a reduction in turbomachinery and heat exchangers footprints.

The present teaching relates to an all-steam gasification system, that may include carbon capture, which integrates with a supercritical $CO_2$ power cycle. Such systems can substantially improve efficiency and will hasten widespread adoption of gasification with supercritical $CO_2$ power cycle technology where coal is the fuel of choice. Due to unique designs in each of the subsystems, there is also a great reduction of cost, for both fuel and capital.

The all-steam gasification and carbon capture system of the present teaching incorporates several known technologies with major improvements. The all-steam gasification and carbon capture system of the present teaching produces hydrogen from coal or other feedstocks for electric power and/or production of chemicals. The all-steam gasification system of the present teaching produces substantially nitrogen-free high hydrogen and/or syngas for applications, such as IGCC with Carbon Capture and Storage (CCS), Coal-to-Liquids (CTL) and Polygeneration plants. Polygeneration, as used herein, is a term that describes its multi-product capability. One result is that the all-steam gasification and carbon capture system of the present teaching provides higher efficiency with costs that are low enough to make coal competitive in a carbon-constrained world. The combined improvements in key subsystems of the all-steam gasification and carbon capture system of the present teaching produces power and polygeneration with the necessary efficiencies required to achieve world-wide competitiveness with low enough emissions to solve global warming concerns.

In addition, all-steam gasification produces a much larger quantity of hydrogen per pound of coal or other feedstock compared with other known methods. Air blown combustors eliminate the large expensive air separation plant for producing oxygen, normally used for such systems, significantly improving efficiency and cost. All-steam gasification can be used with oxygen combustion for integration with supercritical $CO_2$ power cycle systems. An indirect gasifier enables the production of substantially nitrogen-free hydrogen and syngas necessary for polygeneration of liquids and chemicals while maintaining power-only and coal-to-liquids-only-modes by keeping air from mixing with the critical streams.

Furthermore, the use of micronized char produced in a devolatilizer and in a char preparation system enables rapid gasification of the feedstock in seconds. The use of micronized char significantly reduces the gasification plant size and provides increased capacity in modularized equipment. Adiabatic calcium looping that may include integral water gas shift, using high temperature fixed beds and limestone-based sorbents enhances the overall carbon capture system. The result is pipeline-quality, high-pressure $CO_2$. The high-temperature process enables heat from a shift reactor to be recovered at high temperature. This produces much more steam than a lower-temperature shift used in prior art conventional shift systems.

Such systems avoid the need for steam to regenerate the sorbents used to capture carbon dioxide. Integrated high temperature heat recovery systems using specialized high temperature heat exchangers support the overall system with very high efficiency. Finally, such systems utilize known warm-gas clean-up systems that produce near-zero emissions, easing air pollution while reducing temperature cycling. Adding a warm-gas clean-up system leverages the normal capability of syngas cleanup at higher temperature.

An advantage of all-steam gasification that may include carbon capture integrated with supercritical $CO_2$ power cycle systems of the present teaching is that it provides even higher efficiency. The all-steam gasification in these systems produces more hydrogen per pound of coal, and is about three times faster than $CO_2$ gasification systems. The micronized char of the present teaching is much faster than prior art oxygen blown gasifiers. In some embodiments, the indirect gasifier uses air, so no large air separation unit is required. Warm Gas Clean-Up (WGCU) is used to further improve efficiencies so that these systems match the efficiency of much higher temperature carbon capture approaches.

One feature of the all-steam gasification system of the present teaching is that the ratio of CO to $H_2$ produced by the indirect gasifier may be varied by varying the amount of steam, char or other materials supplied to the indirect gasifier. In this way, the ratio of CO to $H_2$ can be optimized. In some embodiments the ratio of CO to $H_2$ produced is optimized to integrate with a particular supercritical $CO_2$ power cycle system or a particular set of supercritical $CO_2$ power cycle systems.

The supercritical carbon dioxide power cycle is similar to other turbine cycles, except it uses $CO_2$ as the turbomachinery working fluid. The cycle operates above the critical point of $CO_2$ and does not change from liquid to gas. Instead, it undergoes large density changes over a small range of temperature and pressure. One advantage is that a large amount of energy is extracted at high temperature from compact equipment. Specifically, $CO_2$ turbomachines are used with a nominal gas path diameter that is an order of magnitude smaller than combustion turbines or steam turbines.

In some known supercritical $CO_2$ power cycle systems, the $CO_2$ is heated by a heat source. Energy is extracted from the $CO_2$ as it is expanded in the turbine. Remaining heat is extracted in one or more highly efficient heat recuperators to preheat the $CO_2$ going back to the main heat source. Recuperators increase efficiency by limiting cycle heat rejection. Supercritical $CO_2$ power cycle provides attractive water consumption and emission profiles.

FIG. 1 illustrates a system block diagram of an all-steam gasification system with air-based combustion for a generic supercritical $CO_2$ power cycle system with carbon capture system 100 according to the present teaching. Some embodiments of the coal feed system 102 take in coal, $H_2$ and air, and emit flue gas. Also, some embodiments of the coal feed system 102 use a rotary valve feeder and a fluid bed coal drier with a mixer.

The coal feed system 102 provides solid fuel to a micronized char preparation system 104. Some embodiments of the micronized char preparation system 104 include, for example, various components, such as a devolatilizer, char cooler/steam heater, let-down valve, pulverizer, electrostatic separator, air lock and syngas char conveyer. One feature of the present teaching is that the micronized char preparation system 104 can be used to produce micronized char that advantageously speeds the gasification process. That is, some embodiments of the micronized char preparation system 104 prepare micronized char from the coal received from the coal feed system 102, and transfer it to an indirect gasifier 106. In these embodiments, the micronized char preparation system 104 receives crushed coal with a size suitable for fluidization. For example, fluidization sizes of less than ¼-inch are suitable. The devolatilizer has the capability to crack all the tars.

In one embodiment, the indirect gasifier is an Internally-Circulating Fluidized Bed (ICFB) that uses a single pressure vessel reactor for combustion and gasification. Using a single pressure vessel reactor simplifies operation and reduces equipment size. The single pressure vessel reactor comprises a vertical tube, also called a draft tube, at the center of the reactor. The flow of gases in the draft tube is upwards, while the flow of solids in the fluidized bed-of-dense-solids surrounding the draft tube is downwards. The fluidized bed-of-dense-solids is sometimes referred to as the annular bed and is designed to be deep enough to fully gasify the coal.

In one embodiment, the indirect gasifier combuster operates by combusting fuel and air injected into an entrance of a draft tube to produce the heat required for the steam gasification reaction. For example, the fuel can be char, hydrogen or syngas. Using syngas or hydrogen eliminates the need for a cleanup system for the char combustion. The combustion reduces the density of the flowing stream, compared with that of the dense-fluidized-bed reactor surrounding it. This creates a pressure difference at the bottom of the draft tube that causes the bed-of-dense-solids in the annular section to flow downward where they are entrained by the gases flowing up the draft tube, thereby causing the continuous circulation of hot solids around inside the reactor.

The solids comprising the fluidized dense-bed-of-solids are a relatively high-density refractory sand, such as alumina. High-density solids provide a sufficient flow rate of the circulating solids to limit the temperature difference around the loop to an acceptable level, of about 200° F. The circulation flow can be as much as 100-times the flow of fuel, or syngas. The refractory sand is fine enough to be fluidized by the flow of syngas created from the steam and micronized char that enter through a distributor plate.

The ICFB indirect gasifier mixes micronized char with steam at a high-enough temperature to convert them to hydrogen and carbon monoxide, by the so-called water-gas reaction. The heat of reaction is provided by the combustion of hydrogen or syngas and air in the combustor at the bottom of the gasifier. The products of combustion quickly mix with hot circulating solids flowing down into the mixer. The mixture of hot solids and the products of combustion then flow up through the draft tube. At its top, the solids fall back onto the surrounding fluidized dense-bed-of-solids, while the products of combustion exit through a vent at the top of the reactor. A funnel shape at the top of the draft tube allows a dilute bed to form that prevents the elutriation of particles into the freeboard. The heat of combustion keeps the bed material hot, to provide heat for gasification. Solids flow downwards while the char and steam, and then the hydrogen and carbon monoxide (syngas) formed from the steam-char reaction flow upwards.

Although it is possible to gasify coal directly without using a char preparation system 104, it is preferable in many systems to first convert the coal into char and then gasify the char in the indirect gasifier 106. This is because char is much more brittle than coal since most of the interior of the coal particles have been hollowed out by pyrolysis. Pyrolysis produces char particles with a range of geometries. Char particle geometry may comprise a thin-shell sphere. The char particles can also be formed in a Swiss cheese like geometry. The hollowed-out geometry causes char particles to break into far smaller pieces when pulverized than coal. Particles below eight microns are readily achieved. The small size of pulverized char particles hastens gasification.

Another feature of using micronized char is that it is non-wetting, although the ash may be sticky. Micronized char is non-wetting because the particles remain entrained in the gases in which they flow, rather than colliding with each other or other surfaces. The non-wetting feature avoids the fouling, clinkering, agglomeration, and corrosion common in prior art coal-fired power systems using pulverized coal as the solid fuel.

Some embodiments of the carbonaceous fuel gasification system of the present teaching include a micronized char preparation system 104 that comprises a devolatilizer that receives solid carbonaceous fuel, hydrogen, oxygen, and fluidizing steam and produces micronized char, steam, volatiles, and hydrogen. In some embodiments, the micronized char preparation system 104 includes a counter-flow char cooler that preheats steam as it cools the char, a pressure let-down valve, a pulverizer that reduces the average size of the micronized char to under 10μ, and an airlock that re-pressurizes the micronized char to the inlet. In one specific embodiment, the carbonaceous fuel is coal. In some embodiments, the devolatilizer comprises a heated pressure vessel comprising an inlet for injecting fluidizing steam, and at least one outlet for removing volatiles and coarse char.

The all-steam gasification system with air-based combustion for a generic supercritical $CO_2$ power cycle system with carbon capture of the present teaching includes a cyclone 108 that separates course char from volatiles provided by the micronized char preparation system 104. Char entrained in the volatiles leaving the micronized char preparation system 104 are captured by the cyclone 108. The cyclone 108 has a first outlet that provides coarse char to the micronized char preparation system 104 and a second outlet that is coupled to an input of the indirect gasifier 106. In some embodiments, the second outlet provides volatiles to the indirect gasifier 106. The overhead gasses from the cyclone 108 are sent to the indirect gasifier 106 thereby using equilibrium to minimize the formation of $CH_4$, etc.

Some embodiments of the indirect gasifier 106 include a vessel comprising a gasification chamber 110, or gasifier, which receives the micronized char from the micronized char preparation system 104, and which receives a conveying fluid, and steam. In some embodiments, the indirect gasifier 106 receives volatiles from the outlet of the micronized char preparation system 104. In some embodiments, the gasification chamber 110 receives steam from an outlet of a char cooler. Some embodiments of the gasification chamber 110 produce syngas, ash, and steam at one or more outlets.

The indirect gasifier 106 also includes a combustor 112. The combustor 112 may also be referred to as a combustion chamber. Some embodiments of the combustor 112 receive a mixture of hydrogen or syngas and oxidant and burn the mixture of hydrogen or syngas with the oxidant to provide heat for gasification and heat used to heat incoming flows in order to generate steam and nitrogen. For example, the mixture can include syngas with mostly hydrogen, such as about 99% hydrogen and 1% carbon monoxide or can include a mixture of less than 10% carbon monoxide (greater than 90% hydrogen) or less than 1% carbon monoxide (greater than 99% hydrogen). Also, for example, the oxidant can be air or oxygen. In some embodiments, the heat for gasification is transferred from the combustor 112 to the gasifier 110 by circulating refractory sand.

The indirect gasifier 106 of the present teaching produces syngas from the micronized char. Prior art indirect gasifiers have been used to make methane and syngas from biomass. In some embodiments, the heat for the reactions in the indirect gasifier 106 is created by combustion in the combustor 112, and gasification in the gasifier 110. The gases emerging from each chamber are kept separated. The heat transfer between the chambers required for gasification is provided by circulating hot solids. The hot solids are heated in the combustor and cooled by gasification in the gasifier 110.

One feature of using an indirect gasifier 106 of the present teaching is that it makes all-steam gasification (ASG) possible. Furthermore, indirect gasification using air for combustion in the combustor 112 eliminates the need for a large oxygen plant, also known as an air separation unit (ASU), while facilitating fuels production and Poly Generation. This is because the products of combustion are kept separate from the syngas, thereby avoiding the contamination of the syngas by nitrogen in the combustion air. Eliminating the need for an oxygen plant will reduce costs significantly and will also significantly reduce the footprint of the system. Indirect gasifiers 106 of the present teaching advantageously require less oxidant than prior art gasification systems. In one specific embodiment, the indirect gasifier 106 uses an oxygen supply that is approximately 8.5% of that required for a prior art gasification and requires an air supply that is approximately 40% of that required for a prior art gasifier. In various embodiments, a wide range of percentage saving of oxygen and air supply compared to prior art gasification is realized. The indirect gasifier 106 also receives volatiles and methane that are provided from the devolatilizer through the cyclone 108.

Indirect gasification creates an improvement in both the efficiency and the costs of gasification systems used to produce chemicals. An additional important feature of using the indirect gasifier 106 is the use of hydrogen and/or syngas in the combustor 112 to provide gasification heat allowing all or a high fraction of the carbon in the coal to be used to produce the maximum amount of hydrogen per pound of coal.

The indirect gasifier 106 produces syngas at one output that is provided to a syngas cooler 114. Some embodiments of the syngas cooler 114 have an inlet coupled to the outlet of the gasifier 110 of the indirect gasifier 106, where the syngas cooler 114 cools the syngas, and generates steam at an outlet. The syngas cooler 114 provides steam to the small steam cycle 116. The small steam cycle 116 can be part of the supercritical $CO_2$ power cycle in some embodiments. In some embodiments, the syngas cooler 114 provides syngas cooled steam for an air separation unit or other drivers while providing excess power.

The syngas cooler 114 includes a pressure vessel. In some embodiments, the syngas cooler 114 houses multiple fluidized beds that are supported by distributer plates with steam tubes embedded in the fluidized beds. The turbulence of a fluidized bed prevents the buildups that can occur in conventional fire tube heat exchangers. The use of more than one bed in the syngas cooler 114, with successive beds flowing upwards operating at lower temperatures, increases the efficiency of the steam turbine that utilizes the waste heat from the syngas cooler 114. Some embodiments of the syngas cooler 114 utilize a fluidized-bed cooler design that exhibits significantly higher heat transfer coefficients than a conventional fire tube cooler. The use of such a syngas cooler 114 reduces the heat exchanger's size and cost.

Some embodiments of the supercritical $CO_2$ power cycle system using all-steam gasification with carbon capture system 100 use a syngas cleanup system 120 having an input that receives the cooled syngas from the outlet of the syngas cooler 114 to remove impurities. The syngas cooler 114 cools hot syngas leaving the indirect gasifier 106 to the temperature required by the syngas cleanup system 120. In some embodiments of the syngas cleanup system 120, a transport desulfurizer processes the syngas and then passed to a candle filter that removes ash. When needed, the syngas is passed to a polishing desulfurizer. A sorbent regenerator uses air from a boost air compressor to collect sulfur dioxide that is removed from the transport desulfurizer by a sorbent material. This sulfur dioxide can be sent to a direct sulfur converter to produce sulfur. Finally, a multi-contaminant scrubber is used to remove mercury, and ammonia, arsenic, and selenium as needed.

Some embodiments of syngas cleanup system 120 of the present teaching use a Warm Gas Cleanup System (WGCU) as shown in FIG. 1 that was developed by Research Triangle Institute headquartered in the Research Triangle Park in North Carolina. This type of syngas cleanup system can remove essentially all pollutants, including sulfur, particulate matter, and trace elements, such as ammonia, mercury, selenium, and arsenic with high efficiencies. Using the WGCU will bring emissions below the strictest levels of EPA standards. Ammonia is also removed to minimize NOx emissions.

The syngas cleanup system 120 removes pollutants and sends the syngas to compressor 122. The compressor 122 may be part of the supercritical $CO_2$ power cycle 118 (not shown). The compressor 122 compresses the syngas to a pressure and temperature appropriate for a supply input to the supercritical $CO_2$ power cycle 118. In one specific embodiment, the compressor 122 provides approximately 300 Btu/cuft of syngas without nitrogen at 600-700 PSI at 500 degrees F. The supercritical $CO_2$ power cycle 118 produces carbon dioxide and power.

A second output of the indirect gasifier 106 provides products of combustion, steam, nitrogen and carbon dioxide, to a Product of Combustion (POC) system with adiabatic calcium looping (ACL) system 124. Adiabatic calcium looping product of combustion systems use adiabatic, adsorption, pressure-swing, and fixed bed carbon-capture systems for removing the carbon compounds from the syngas or products of combustion generated from the solid fuel. Adiabatic refers to a process in which no heat is added to, or removed from, the sorbent. Instead, the heat for the reactions is provided or removed by changes in the temperature of the sorbent itself. This means that the sorbent heats up during carbonation and cools back to its original temperature during calcination, before the cycle is repeated.

Some embodiments of the POC with ACL system 124 of the present teaching remove the carbon dioxide from a pressurized stream of products of combustion from the indirect gasifier 106. In various embodiments, the POC with ACL system 124 of the present teaching is used to remove carbon dioxide.

The ACL system within the POC with ACL system 124 of the present teaching is sometimes referred to as POC with pressure-swing calcium looping. Pressure-swing calcium looping differs from prior art temperature-swing calcium looping systems that are sometimes used with post-combustion carbon capture systems where the two reactors are at the same pressure, but are at different temperatures. In temperature-swing calcium looping, typically two fixed bed reactors are used. Pressure-swing calcium looping overcomes many limitations of prior art temperature-swing systems. Pressure-swing calcium looping can negate the high attrition rate of the sorbent particles. Pressure-swing calcium looping does not require the use of oxygen to burn fuel which is inconvenient and expensive.

One advantage of the POC with ACL system 124 of the present teaching is that it requires a relatively small equipment footprint. Embodiments of the adiabatic calcium looping apparatus of the present teaching are typically many times smaller than conventional air-blown equipment of the prior art. Other benefits of the POC with ACL system 124 of the present teaching include providing relatively high plant efficiency, providing relatively high carbon-capture efficiency. Also, the sorbent used in the POC with ACL system 124 of the present teaching is non-toxic, unlike the conventional amine sorbents used in prior art systems. Furthermore, these non-toxic sorbents do not require external regeneration with heat.

The POC with ACL system 124 of the present teaching also avoids the need for steam to regenerate the sorbent. This is because calcium looping captures the carbon from the gases in one reactor (the "carbonator"), and releases carbon dioxide from the sorbent in a second reactor, (the "calciner").

The POC with ACL system 124 of the present teaching converts high temperature gas into power at an output. In some embodiments, the POC with ACL system 124 provides expander power (electric or mechanical). The POC with ACL system 124 provides steam to a stack via a cooler and condenser 128 at a second output. The POC with ACL system 124 also provides carbon dioxide to the supercritical $CO_2$ power cycle 118 at a third output. In some embodiments, the POC with ACL system 124 provides pure $CO_2$ stream in a range of about 3-28 PSI and at a temperature that is typically less than 1,800° F. to the supercritical $CO_2$ power cycle 118.

Figure 2:
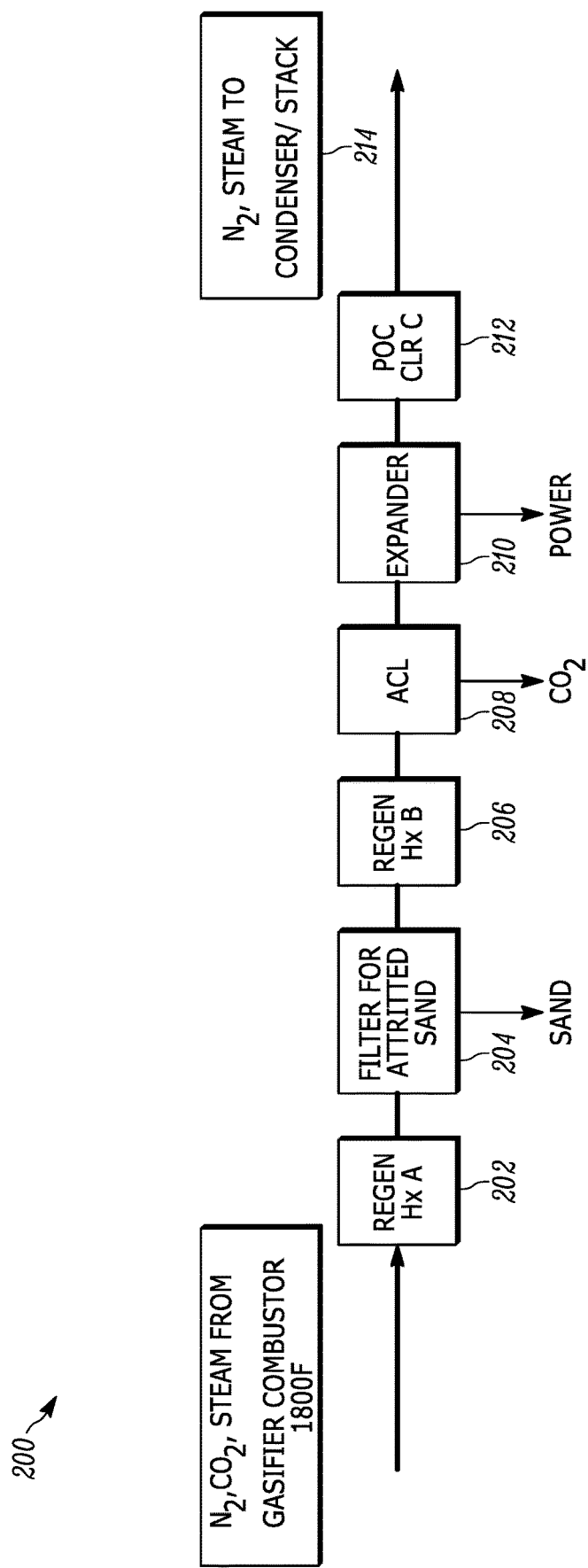
FIG. 2 illustrates an embodiment of a Products of Combustion System (POC) with Adiabatic Calcium Looping (ACL) that removes $CO_2$ and nitrogen.

FIG. 2 illustrates an embodiment of a Products of Combustion System (POC) with Adiabatic Calcium Looping (ACL) 200 that removes $CO_2$ and nitrogen. Referring to both FIGS. 1 and 2, nitrogen, carbon dioxide, and steam from the combustor 112 of the indirect gasifier 106 at approximately 1800 degrees Fahrenheit are fed into a first regenerative heat exchanger 202. The output of the first regenerative heat exchanger 202 supplies the input of a filter 204 that removes potentially attritted sand. The output of the filter 204 supplies the input of a second regenerative heat exchanger 206, which heats the products of combustion and supplies at an output the input of a pressure swing adiabatic calcium looping apparatus 208. The pressure swing adiabatic calcium looping apparatus 208 produces carbon dioxide at one output and produces nitrogen at a second output that is directed to an expander 210 that produces power. A products of combustion cooler 212 cools the output from a second output of the expander 210 and provides nitrogen and steam 214 to a condenser or stack (not shown).

Figure 3:
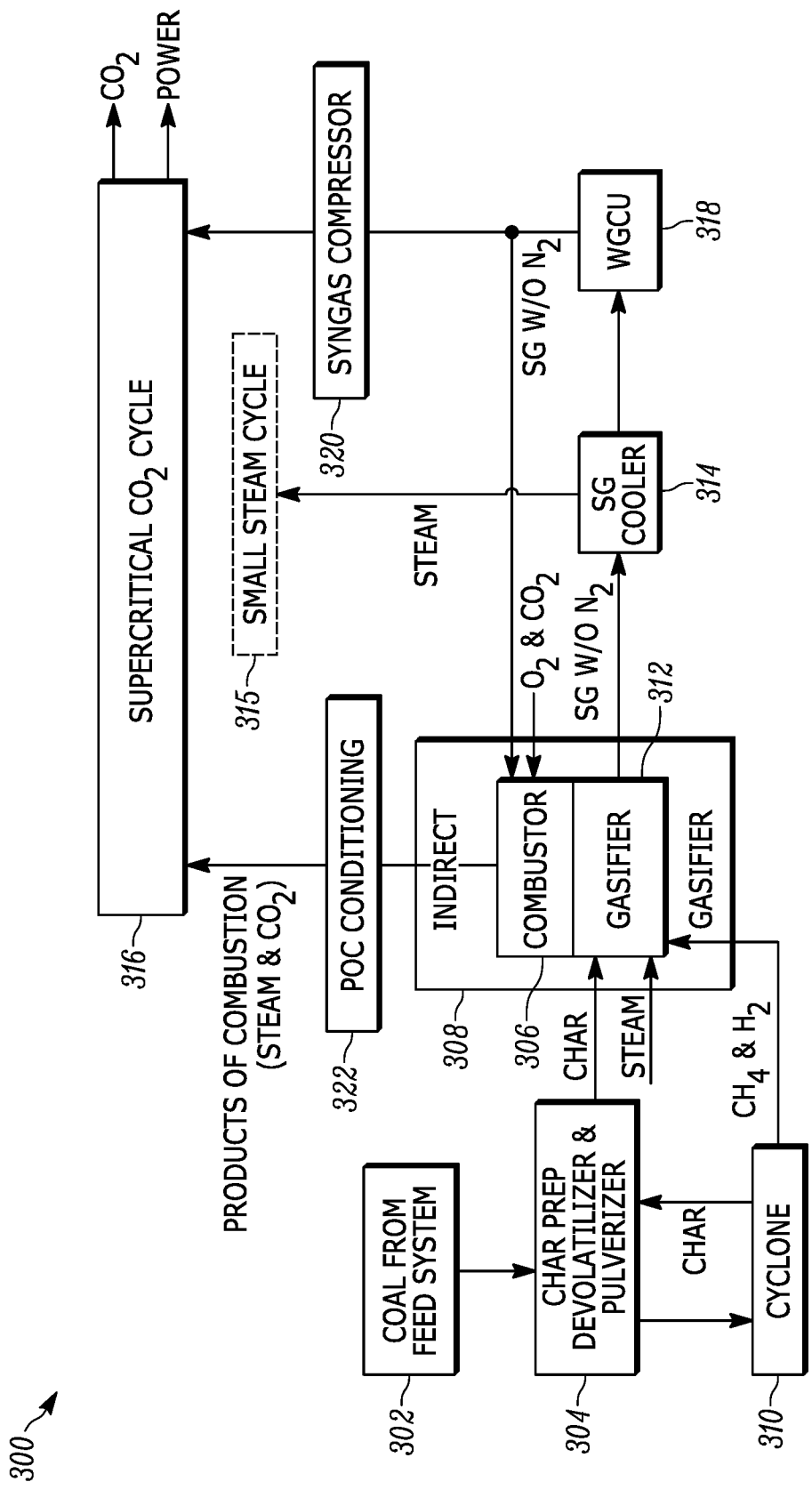
FIG. 3 illustrates a system block diagram of an all-steam gasification system with oxygen-based combustion for a generic supercritical $CO_2$ power cycle system according to the present teaching.

FIG. 3 illustrates a system block diagram of an all-steam gasification system with oxygen-based combustion for a generic supercritical $CO_2$ power cycle system 300 according to the present teaching. The embodiment of the all-steam gasification system with oxygen-based combustion for a generic supercritical $CO_2$ power cycle system 300 shown in FIG. 3 is similar to the all-steam gasification system with air-based combustion for a generic supercritical $CO_2$ power cycle system with carbon capture system 100 illustrated in FIG. 1. However, in the all-steam gasification system with oxygen-based combustion for a generic supercritical $CO_2$ power cycle system 300 of FIG. 3, oxygen is supplied to a combustor rather than air as described in connection with FIG. 1. The oxygen needs a moderator such as $CO_2$.

A solid fuel feed system 302 is used to provide solid carbonaceous fuel to a micronized char preparation system 304. In some methods, the fuel is coal. The char preparation system 304 provides char at an output to an input of a combustor 306 of an indirect gasifier 308. Char entrained in the volatiles leaving the micronized char preparation system 304 are captured by a cyclone 310. The cyclone 310 provides coarse char back to the pulverizer in the micronized char preparation system 304. Overhead gasses from the cyclone 310 are sent to a gasifier 312 in the indirect gasifier 312, thereby using equilibrium to minimize the formation of $CH_4$.

The gasifier 312 is supplied steam, methane and hydrogen and provides syngas without nitrogen to a syngas cooler 314. The syngas cooler 314 generates steam at an output that is provided to an input of a small steam cycle 315. The small steam cycle 315 can be part of the supercritical $CO_2$ power cycle 316 in some embodiments. In some embodiments, the syngas cooler 314 also provides steam for an air separation unit or other drivers (not shown). The syngas cooler 314 provides cooled syngas without nitrogen to a warm gas clean-up (WGCU) 318. In various embodiments, the WGCU 318 removes contaminants such as particulates, sulfur compounds, hydrogen and other trace contaminants from the syngas. Syngas from the WGCU 318 is passed through a syngas compressor 320 and then provided to an input of the supercritical $CO_2$ power cycle 316. The syngas compressor 320 may also be part of the $CO_2$ power cycle 316. In some embodiments, the compressor 320 provides approximately 300 Btu/cuft syngas without nitrogen at a pressure that is in the range of about 600-700 PSI and a temperature that is approximately 500 degrees F. to the supercritical $CO_2$ power cycle 316.

The combustor 306 is supplied oxygen and syngas. Some embodiments supply syngas to the combustor 306 from the WGCU 318. In some embodiments, the oxygen is supplied by the same plant that supplies the supercritical $CO_2$ power cycle 316. In other embodiments, the oxygen is supplied by a separate air separation unit or other oxygen producing device. In some embodiments, the combustor 306 requires approximately 50% less oxygen supply compared to known blown gasifiers.

The output of the indirect gasifier 308 supplies products of combustion to a products-of-combustion conditioner 322. The output of the products-of-combustion conditioner 322 is supplied to the supercritical $CO_2$ power cycle 316. In various embodiments, the products of combustion conditioner 322 supplies the $CO_2$/Steam mixture at the appropriate conditions for the particular supercritical $CO_2$ power cycle.

One advantage of the all-steam gasification system for supercritical $CO_2$ power cycle system is its small size. In some embodiments, the gasifier is a single vessel less than 50 feet tall for a 500 MWe plant. This is many times smaller than prior art gasifiers. A syngas cooler structure of the present teaching is a single structure of approximately 40 feet high. This is approximately four times smaller than prior art syngas cooler units.

A hydrogen sulfide absorber of the present teaching is provided in a single structure that is approximately 100 feet high. This is approximately four times smaller than prior art hydrogen sulfide removal systems. One embodiment of the present teaching provides two $CO_2$ absorbers that are 120 feet high, which is approximately two times smaller than in prior art systems. In some specific embodiments, the gasifier 312 comprises a 50-foot-tall shippable fluid bed gasifier for single train 500 MWe. By providing equipment sizes that are less than 100 foot tall, many parts of the system can be shipped inexpensively by vehicles, as compared to many prior art systems that require field fabrication for plants generating half this power capacity.

The physical size of the all-steam gasification system for supercritical $CO_2$ power cycle system is further reduced because $CO_2$, syngas, steam, and power can be supplied to a supercritical $CO_2$ power cycle 316 without requiring $CO_2$ flash drums or water gas shift reactors. In addition, some embodiments of the present teaching require only three 50% coal feed/driers at approximately 10% volume. This is contrasted to prior art systems that require six coal feed/driers. Thus, the methods and apparatus of the present teaching represent substantial savings in terms of footprint, as well as related operations and maintenance simplifications. Various embodiments of the present teaching cost less than half of competing prior art technologies.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of carbonaceous fuel gasification, the method comprising:
   a) producing micronized char, steam, volatiles, and hydrogen from solid carbonaceous fuel, hydrogen, and oxygen;
   b) providing fluidizing steam to a micronized char preparation system, the micronized char preparation system comprising a devolatilizer;
   c) producing syngas and steam by gasifying the micronized char in an indirect gasifier, the indirect gasifier comprising a vessel having a gasification chamber;
   d) burning a mixture of hydrogen and carbon monoxide with an oxidant in a combustion chamber in the indirect gasifier to provide heat for gasification using circulating refractory sand, thereby generating CO2;
   e) generating steam in a syngas cooler coupled to an outlet of the indirect gasifier; and
   f) directing the generated CO2 to a supercritical CO2 power cycle system.

2. The method of claim 1 wherein the burning of the mixture of hydrogen and carbon monoxide with the oxidant in the combustion chamber generates steam and nitrogen that are directed to a products of combustion system, the products of combustion system comprising adiabatic calcium looping.

3. The method of claim 1 wherein the burning of the mixture of hydrogen and carbon monoxide with the oxidant in the combustion chamber generates steam and nitrogen that are directed to a products of combustion system, the products of combustion system comprising carbon capture system.

4. The method of claim 3 further comprising directing the steam and nitrogen generated by the combustor to an expander and then to stack condensers.

5. The method of claim 1 wherein the burning of the mixture of hydrogen and carbon monoxide with the oxidant in the combustion chamber generates steam that is directed to the supercritical CO2 power cycle system.

6. The method of claim 1 wherein the method further comprises performing all-steam gasification.

7. The method of claim 1 wherein the oxidant comprises oxygen.

8. The method of claim 1 wherein the oxidant comprises air.

9. The method of claim 1 wherein the burning of the mixture of hydrogen and carbon monoxide with the oxidant in a combustion chamber further comprises adding CO2 to the oxidant.

10. The method of claim 1 wherein the carbonaceous fuel comprises coal.

11. The method of claim 1 wherein the gasifying of the micronized char comprises providing the indirect gasifier with volatiles from the micronized char preparation system.

12. The method of claim 1 further comprising injecting fluidizing steam into a heated pressure vessel of the devolatilizer and removing volatiles and coarse char from the heated pressure vessel.

13. The method of claim 1 further comprising separating course char from volatiles using a cyclone and injecting the separated coarse char into the micronized char preparation system and injecting the volatiles into the indirect gasifier.

14. The method of claim 1 further comprising directing the steam and CO2 generated by the indirect gasifier combustor to a product of combustion conditioning system before directing to the input of the supercritical CO2 power cycle system.

15. The method of claim 1 further comprising processing the syngas to reduce impurities using a syngas clean-up system.

16. The method of claim 1 further comprising receiving steam in the gasification chamber from a steam heater.

17. The method of claim 1 further comprising receiving steam in the gasification chamber from a heat recovery system.

18. The method of claim 1 further comprising directing the steam generated by the syngas cooler to a small steam cycle.

19. The method of claim 18 wherein the supercritical CO2 power cycle system comprises the small steam cycle.

\* \* \* \* \*